US010701600B2

(12) United States Patent
Larsson et al.

(10) Patent No.: US 10,701,600 B2
(45) Date of Patent: Jun. 30, 2020

(54) 5G CORE NETWORK OPTIMIZED LOCAL HANDOVER

(71) Applicant: Telefonaktiebolaget LM Ericsson (publ), Stockholm (SE)

(72) Inventors: Conny Larsson, Åkersberga (SE); Michael Eriksson, Sollentuna (SE); Dinand Roeland, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/617,394

(22) PCT Filed: May 31, 2017

(86) PCT No.: PCT/SE2017/050581
§ 371 (c)(1),
(2) Date: Nov. 26, 2019

(87) PCT Pub. No.: WO2018/222095
PCT Pub. Date: Dec. 6, 2018

(65) Prior Publication Data
US 2020/0162973 A1  May 21, 2020

(51) Int. Cl.
*H04W 36/00* (2009.01)
*H04W 8/08* (2009.01)
*H04W 36/08* (2009.01)
*H04W 76/11* (2018.01)
*H04W 76/12* (2018.01)
(Continued)

(52) U.S. Cl.
CPC ......... *H04W 36/0077* (2013.01); *H04W 8/08* (2013.01); *H04W 36/0011* (2013.01); *H04W 36/0061* (2013.01); *H04W 36/08* (2013.01); *H04W 36/14* (2013.01);
(Continued)

(58) Field of Classification Search
CPC . H04W 36/0077; H04W 76/12; H04W 76/11; H04W 8/08; H04W 36/0011; H04W 36/0061; H04W 36/08; H04W 36/14; H04W 64/003
See application file for complete search history.

(56) References Cited

U.S. PATENT DOCUMENTS

| 2012/0307732 A1* | 12/2012 | Olsson | H04W 64/00 370/328 |
| 2019/0166634 A1* | 5/2019 | Ni | H04W 76/10 |
| 2019/0306768 A1* | 10/2019 | Kim | H04B 17/327 |

OTHER PUBLICATIONS

Author Unknown, "Technical Specification Group Services and System Aspects; System Architecture for the 5G System; Stage 2 (Release 15)," Technical Specification 23.501, Version 0.4.0, 3GPP Organizational Partners, Apr. 2017, 124 pages.
(Continued)

*Primary Examiner* — Kyaw Z Soe
(74) *Attorney, Agent, or Firm* — Withrow & Terranova, PLLC (57) ABSTRACT

The invention relates to an access manager, and a method performed by the access manager of transferring data in a wireless communication system comprising a control plane distributed over at least one first site and over at least one second site, wherein a session manager is arranged in the control plane of the second site and the access manager is arranged in the control plane of the first site, the first site being remote from the second site and located physically closer to a radio access network of the wireless communication system.

15 Claims, 7 Drawing Sheets

(51) Int. Cl.
*H04W 64/00* (2009.01)
*H04W 36/14* (2009.01)

(52) U.S. Cl.
CPC .......... *H04W 64/003* (2013.01); *H04W 76/11* (2018.02); *H04W 76/12* (2018.02)

(56) References Cited

OTHER PUBLICATIONS

Author Unknown, "Technical Specification Group Services and System Aspects; Procedures for the 5G System; Stage 2 (Release 15)," Technical Specification 23.502, Version 0.3.0, 3GPP Organizational Partners, Mar. 2017, 115 pages.
Author Unknown, "Technical Specification Group Radio Access Network; NR; NR and NG-RAN Overall Description; Stage 2 (Release 15)," R2-1704452; Technical Specification 38.300, Version 0.2.1, 3GPP Organizational Partners, May 2017, 48 pages.
Roeland, Dinand, et al., "Novel Core Network Architecture for 5G based on Mobile Service Chaining," Mobile Networks and Management, MONAMI 2016, Lecture Notes of the Institute for Computer Sciences, Social Informaticsa nd Telecommunications Engineering, vol. 191, Springer, Cham, Jan. 19, 2017, pp. 44-57.
International Search Report and Written Opinion for International Patent Application No. PCT/SE2017/050581, dated Nov. 3, 2017, 15 pages.
Written Opinion for International Patent Application No. PCT/SE2017/050581, dated Apr. 24, 2019, 5 pages.
International Preliminary Report on Patentability for International Patent Application No. PCT/SE2017/050581, dated Jul. 15, 2019, 24 pages.

* cited by examiner

5G CORE NETWORK OPTIMIZED LOCAL HANDOVER

This application is a 35 U.S.C. § 371 national phase filing of International Application No. PCT/SE2017/050581, filed May 31, 2017, the disclosure of which is incorporated herein by reference in its entirety.

TECHNICAL FIELD

The invention relates to an access manager, and a method performed by the access manager of transferring data in a wireless communication system comprising a control plane distributed over at least one first site and over at least one second site, wherein a session manager is arranged in the control plane of the second site and the access manager is arranged in the control plane of the first site, the first site being remote from the second site and located physically closer to a radio access network of the wireless communication system.

BACKGROUND

A key requirement for next generation of mobile networks is flexibility to support multiple use cases with different network requirements.

Software Defined Networking (SDN) has been proposed for enabling a solution without the need for centralized user plane nodes and with a strict division between control plane and user plane.

Figure 1:
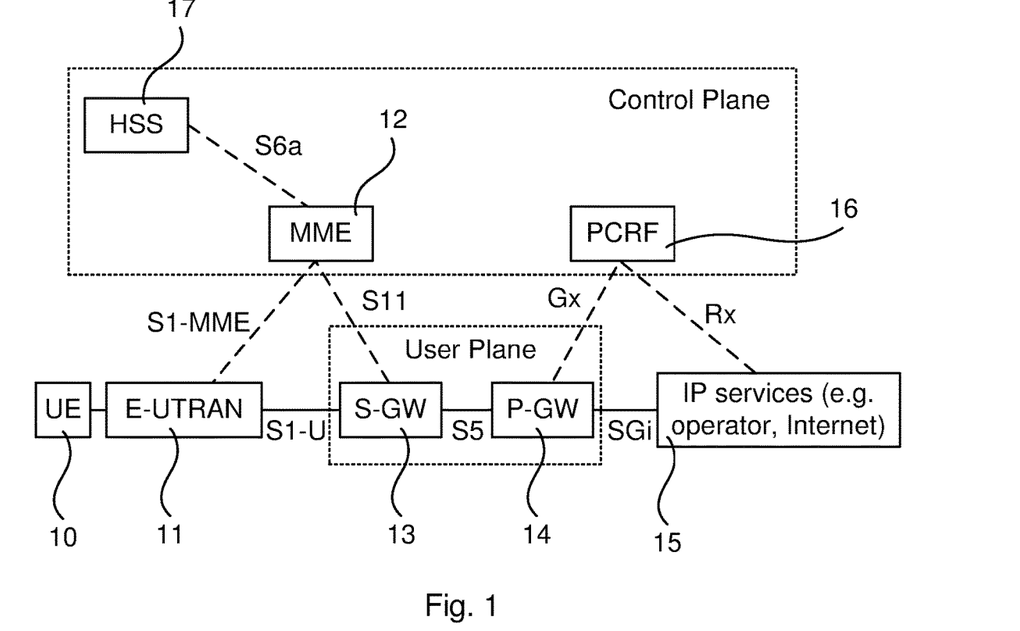
FIG. 1 illustrates an EPC network architecture being the core network in a LTE communication system.

FIG. 1 illustrates an Evolved Packet Core (EPC) network architecture being the core network in a Long Term Evolution (LTE) communication system. A mobile device 10, such as a mobile phone, tablet, smart watch, etc., is referred to as a User Equipment (UE) and connects to a Base Station (BS) residing in an Evolved Universal Terrestrial Radio Access Network (E-UTRAN) 11. In EPC terminology, the BS is called evolved Node B (eNB). The BS is connected to a Mobility Management Entity (MME) 12 which handles signalling related to mobility for E-UTRAN access, such as e.g. tracking and paging of the UE 10. In particular, the MME 12 controls the setup and maintenance of GTP ("General Packet Radio Service Tunnelling Protocol") user plane tunnels between the BS and a Packet Data Network Gateway (P-GW) 14 via a Serving Gateway (S-GW) 13. The P-GW 14 acts as a global mobility anchor point towards IP networks 15 and includes functions like Quality-of-Service (QoS) handling and charging support. The S-GW 13 acts as a local mobility anchor point and includes functions like idle-mode buffering. Policy and charging is governed from a Policy and Charging Rules Function (PCRF) 16. A Home Subscriber Server (HSS) 17 is the prime database for subscription-related information.

A problem in the art is that whereas EPC can be seen as a one-size-fits-all network mainly optimized for mobile broadband, a 5G core network must be able to support many diverse use cases.

SUMMARY

An object of the present invention is to solve, or at least mitigate, this problem in the art and thus to provide an improved method of an access manager of transferring data in a wireless communication system for providing a flexible architecture being capable of handling the many different 5G use cases.

This object is attained in a first aspect of the invention by a method performed by an access manager of transferring data in a wireless communication system comprising a control plane distributed over at least one first site and over at least one second site, wherein a session manager is arranged in the control plane of the second site and the access manager is arranged in the control plane of the first site, the first site being remote from the second site and located physically closer to a radio access network of the wireless communication system. The method comprises receiving information regarding a mobility event where access of a wireless communication device is being transferred from a source access point to a target access point, the access points being connected to said at least one first site, and providing one or more UPFs serving the wireless communication device with information identifying the target access point and information identifying the wireless communication device, wherein the information is provided to the one or more UPFs without passing the control plane of the second site. The method further comprises acquiring information indicating if the access manager is allowed to finish its mobility event procedure without informing the session manager that the access of the wireless communication device is being transferred, and if so finishing the mobility event procedure without informing the session manager that the access of the wireless communication device is being transferred.

This object is attained in a second aspect of the invention by an access manager configured to transfer data in a wireless communication system comprising a control plane distributed over at least one first site and over at least one second site, wherein a session manager is arranged in the control plane of the second site and the access manager is arranged in the control plane of the first site, the first site being remote from the second site and located physically closer to a radio access network of the wireless communication system. The access manager comprises a processing unit and a memory, the memory containing instructions executable by the processing unit, whereby the access manager is operative to receive information regarding a mobility event where access of a wireless communication device is being transferred from a source access point to a target access point, the access points being connected to said at least one first site, provide one or more UPFs serving the wireless communication device with information identifying the target access point and information identifying the wireless communication device, wherein the information is provided to the one or more UPFs without passing the control plane of the second site, and acquire information indicating if the access manager is allowed to finish its mobility event procedure without informing the session manager that the access of the wireless communication device is being transferred and if so finish the mobility event procedure without informing the session manager that the access of the wireless communication device is being transferred.

With the invention, the one or more UPFs serving the wireless communication device in the first site is advantageously provided with information identifying the target access point and information identifying the wireless communication device by the access manager without passing the central control plane in the second site.

This will have as a consequence that the access manager can finish the handover procedure without informing the session manager of the central control plane that the access of the wireless communication device is being transferred from the source base station to the target base station, and the number of processing steps is advantageously reduced, thereby also ensuring that strict latency requirements are met by shortcutting unnecessary signaling and processing.

Reduced number of processing steps is further preferred both from a latency and energy consumption view.

An additional benefit of the proposed solution is that processing is distributed over multiple sites. An operational failure of a node (e.g. a computer or server) in the central site would typically affect several users while a similar failure in the proposed distributed solution only affects those users connected to the non-operational computer on the specific site.

In an embodiment, the information indicating if the access manager is allowed to finish its mobility event procedure without informing the session manager that the access of the wireless communication device is being transferred is acquired from the session manager arranged in the control plane of the second site.

In an embodiment, the information indicating if the access manager is allowed to finish its mobility event procedure without informing the session manager is fetched from a local storage.

In another embodiment, the information has been previously received from the session manager upon performing a Protocol Data Unit (PDU) session establishment procedure for the wireless communication device.

In a further embodiment, the access manager further acquires information regarding which one or more UPFs serving the wireless communication device should be provided with information identifying the target access point and information identifying the wireless communication device.

The UPF information may again be fetched from a local storage, the UPF information having been previously received from the session manager upon performing a PDU session establishment procedure for the wireless communication device.

In a further embodiment, the access manager submits a target access point identifier and a wireless communication device identifier directly to the one or more UPFs for informing about the mobility event.

In still an embodiment, the UPFs are informed in that the access manager submits a target access point identifier and a wireless communication device identifier to a User Context Database (UCD), located in the control plane of the at least one first site, the UCD informing a control plane plugin of the at least one first site, which plugin submits the target access point identifier and the wireless communication device identifier directly to the one or more UPFs.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 illustrates an EPC network architecture being the core network in a LTE communication system, and has previously been discussed in detail.

Figure 2:
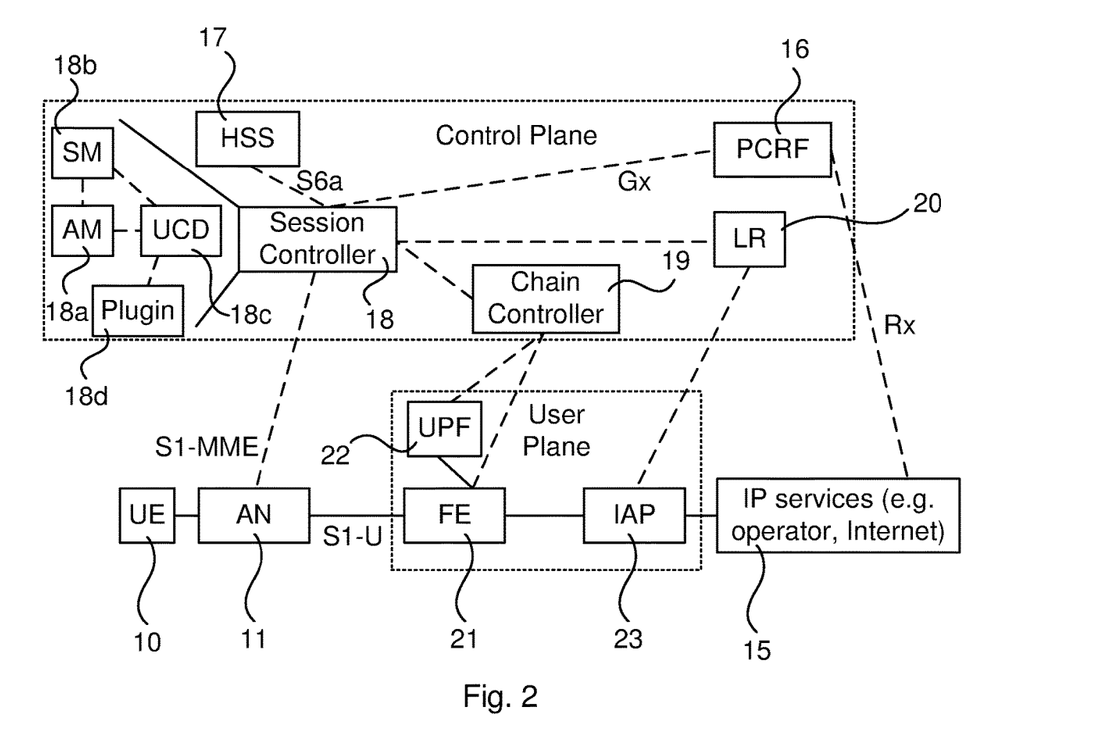
FIG. 2 shows a prior art 5G core network architecture.

FIG. 2 shows a 5G core network architecture previously proposed by one of the inventors in "Novel Core Network Architecture for 5G Based on Mobile Service Chaining" (by Roeland and Fu).

This is a functional architecture and may run on a platform that may be distributed over multiple sites in an operator's network, like a distributed cloud. In an implementation different components could be virtualized and may be combined.

Like EPC, the architecture is divided into a control plane and a user plane. A mobile device 10 communicates with the control and user plane via one or more Access Networks (AN) 11, e.g., a novel 5G radio, E-UTRAN or even a fixed access. In FIG. 2, it is assumed that the S1 interface from EPC is re-used.

The control plane contains all control plane logic, allowing for a strict separation between control and user plane. The Session Controller (SC) 18 includes an Access Manager (AM) 18a for controlling the access of each mobile device connecting to the network. There is one AM for each supported access technology (e.g. LTE, WiFi). For an LTE access, the AM 18a would perform the access-specific functions of the MME.

The SC 18 further comprises a Session Manager 18b for controlling user sessions and creating a service chain for the user. The SC 18 also comprises a User Context Database (UCD) 18c for storing user-specific data (commonly referred to as "context"). The SC 18 may comprise one or more plugins 18d for implementing appropriate functionality. For instance, the AM 18a may be implemented as a plugin.

The UCD 18c further stores information identifying a current base station of this user. A plugin can subscribe to certain changes in this database. For example, a plugin could request to be informed when the current base station for this user changes. If so, an event occurs and the plugin would be informed accordingly.

A Chain Controller (CC) 19 deals with the setup and maintenance of the service chain in the user plane. The control plane also contains a Location Registry (LR) 20, which will be discussed below. Further, the control plane contains the PCRF 16 and HSS 17.

The user plane contains three types of function nodes: Forwarding Element (FE) 21, User Plane Function (UPF) 22 and Internet Protocol (IP) Advertisement Point (IAP) 23.

An FE 21 forwards each packet to one of its ports based on rules it has received from the control plane. An FE 21 may forward a packet through one or more UPFs 22. An FE 21 is only concerned with the actual forwarding; it does not classify or modify a packet.

A UPF is a service function that processes user plane packets. Processing may include altering the packet's payload and/or header. UPFs are not expected to know topological information regarding the chain, including which other UPFs are in the chain and how to reach them. A UPF may serve multiple users, and may or may not keep user context.

For example, if the use case is "mobile broadband" then the UPFs needed could be one or more of: bandwidth limiting, charging, lawful interception, parental control, Quality of Service (QoS) handling, etc. Each use case will have a different set of UPFs. In general, each user may have a different set of UPFs which is referred to as "service chain" or "UPF chain". Basically, every packet for a user will travel through the set of UPFs ("the UPF chain") for that user.

The IAP 23 is a key component to achieve an anchorless network; i.e. a network without a mobility anchor point. Just like a plain IP router, an IAP advertises a range of IP addresses/prefixes towards an outer IP network 15. This may be Internet or an operator-internal network. A single IP address/prefix may be advertised by multiple IAPs. If the IP address of a specific device is advertised by multiple IAPs, then packets for that device can enter the network via any of those IAPs. Similarly, an anchored approach can be achieved by allowing only a single IAP to advertise the IP address for that device. Each IAP is thus pre-configured with one or more address ranges. It is the control plane that assigns an IP address/prefix to the device upon attachment.

The LR 20 of the control plane is a table of entries, where each entry is a mapping from device IP address/prefix to current device location. The location is the address of the first UPF in the chain, plus optionally additional location information, e.g., a BS Identifier (ID). When a device 10 moves from one BS to another, the control plane ensures that the LR 20 is updated with the new location. An IAP is only used for downlink packets heading towards the device. For each downlink packet, the IAP 23 performs the following steps: (1) Query the LR 20 based on the destination IP address of the packet in order to retrieve the location; (2) Tag the packet with the location; (3) Forward the packet via an FE 21 to the first UPF 22 in the service chain as indicated in the LR reply.

Upon attach of a mobile user, its UPF chain will be established in that the SC 18 decides upon the service this user will receive (that is, the set of UPFs this user will be assigned). In practice, this will be handled by interaction between the AM 18a, SM 18b and UCD 18c comprised in the SC 18, as well as with the HSS 17 which stores the user profile required by the SC 18 for determining the services. Conceptually, the UCD 18c holds a copy of this user profile plus additional real-time information. Further, the CC 19 decides where these UPFs shall run (on which data plane execution nodes). The CC 19 is aware of the topology of the data plane and decides an optimal placement of UPFs. This could be very different depending on use case and the given set of UPFs. For example, in a low-latency use case, the UPFs need to execute close to the user. In a plain mobile broadband use case, the UPFs may run where it is cheapest (which oftentimes is in a big centralized data center).

Figure 3:
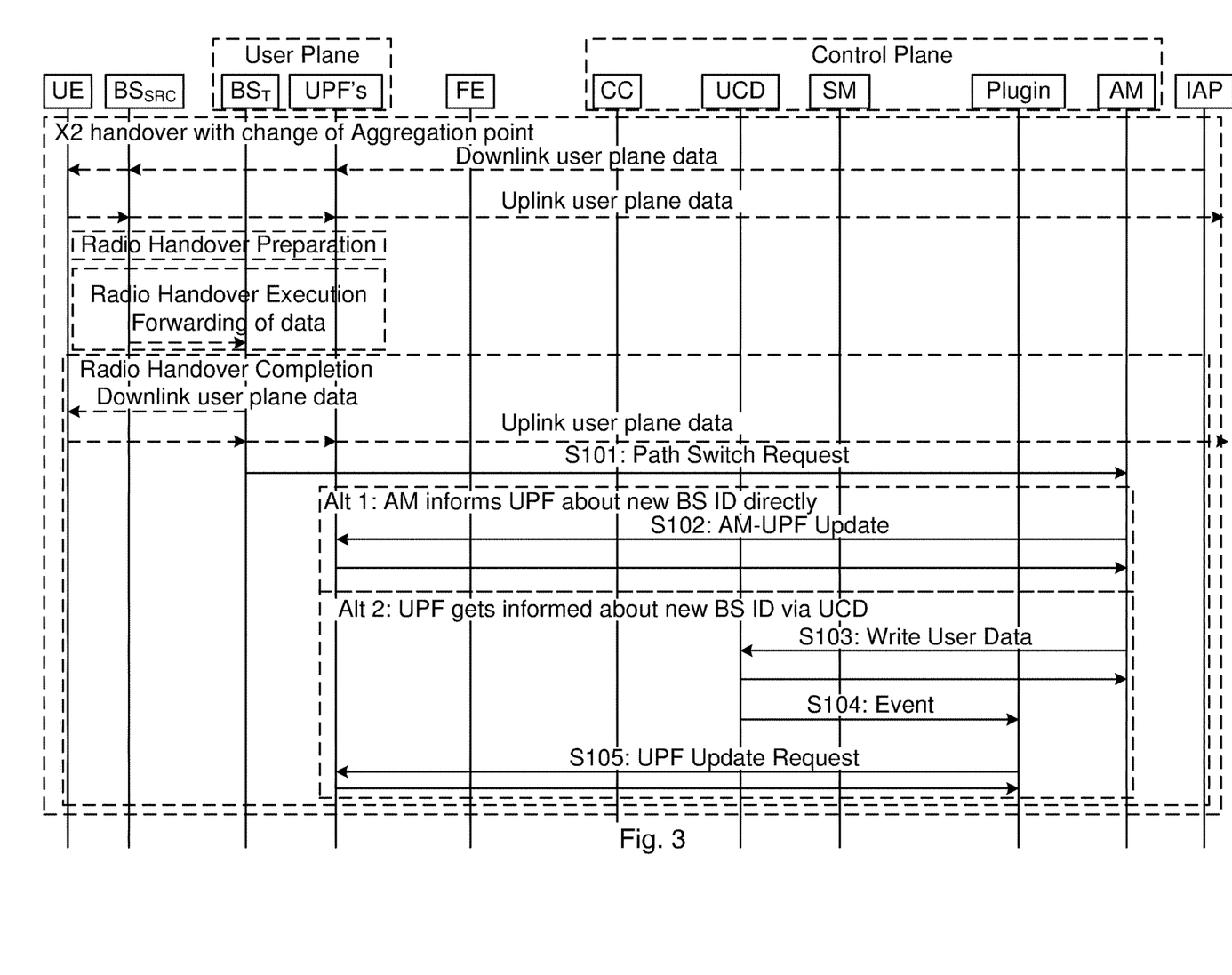
FIG. 3 shows a signalling diagram illustrating handover of a UE in the system of FIG. 2.

FIG. 3 shows a signalling diagram illustrating user mobility in the form of handover of a UE 10 from a base station to which it currently is connected ($BS_{SRC}$) to a target base station to which it is to be handed over ($BS_T$). In FIG. 3, the two base stations are connected to a same local site, which refers to a physical site where certain functions of the core network are executed. It can be viewed as an aggregation point located close to the end-user. A central site is, as the name indicates, a site located at a more central place in an operator's network.

As can be seen, the UE 10 receives user plane data in the downlink from the UPF 22 via the source base station $BS_{SRC}$ and conversely submits, via the source base station $BS_{SRC}$, any user plane data to the UPF 22 and on to e.g. a packet data network such as the Internet. After a handover is completed, the UE 10 receives user plane data in the downlink via the target base station $BS_T$, and submits any user plane data in the uplink via the target base station $BS_T$ to the UPF 22 and further on to an intended recipient.

Now, after the two base stations $BS_{SRC}$ and $BS_T$ initially have engaged in communication over an X2 interface for initiating the handover of the UE 10, the $BS_T$ submits in step S101 a Path Switch Request to the AM 18a of the SC 18 comprising a target base station identifier $BS\text{-}ID_T$ for instance in the form of an IP address, and an identifier UE-ID for the UE 10.

In a first alternative, the AM 18a informs the UPF 22 in step S102 by submitting an AM-UPF Update including $BS\text{-}ID_T$ and UE-ID such that the UPF 22 can submit downlink packages to the base station $BS_T$ serving the UE 10 after the handover is completed. As is shown in FIG. 3, this may be followed by a confirmation submitted by the UPF 22.

In a second alternative, the AM 18a informs the UCD 18c that a handover has occurred in step S103 (possibly followed by a confirmation), thereby submitting $BS\text{-}ID_T$ and UE-ID to the UCD 18c. As previously was described, the UCD 18c stores information identifying the current base station for a user, so the AM 18a updates the UCD 18c with the new location of the UE 10.

An appropriate plugin can subscribe to certain changes occurring in the UCD 18c. For example, a plugin 18d could request to be informed when the current base station for this user changes. If so, an event occurs and the plugin 18d would be informed accordingly is illustrated in the Event message received in step S104. As a result, the plugin 18d submits a UPF Update Request to the UPF 22 in step S105 comprising a target base station identifier (here denoted UPF-Data), and an identifier UE-ID for the UE 10.

Thereafter, in case of handover, any UPFs in the current UPF chain must be informed about the handover and the new base station $BS_T$ to which the UE 10 is handed over, i.e. about any target base station identifier $BS\text{-}ID_T$/UPF-Data, and UE identifier UE-ID.

Hence, the AM 18a submits a message named Inform UE Moved in step S106 to the SM 18b, which in its turn sends a Graph Update Request to the CC 19 in step S107, and the CC 19 submits a Chain Update Request to the FE 21 and the UPF 22 in step S108, which replies with a Chain Update Acknowledge to the CC 19 via the FE 21 in step S109. The CC 19 in its turn submits a Graph Update Acknowledge in step S110 to the SM 18b, which finally sends an Acknowledgement in step S111 to the AM 18a.

It is noted that steps S107-S110 may have to be performed for all FEs and UPFs in the UPF chain.

To confirm the handover of the UE 10 from the source base station $BS_{SRC}$ to the target base station $BS_T$, the AM 18a submits a Path Switch Request Acknowledgement containing the UE-ID in step S112 to the target base station $BS_T$, which finally sends a Release Resource message to the source base station $BS_{SRC}$ in step S113.

The proposed 5G architecture is flexible in regard to the site or sites where the control plane and data plane executes. It would be possible to place all control plane and user plane functionality in a central site. This may be an attractive scenario when processing at large central sites is cheaper than processing at smaller local sites. It would also be possible to place all control plane and user plane functionality in a local site. This may be attractive when low latency towards the user is required.

More advanced scenarios are also possible. For example, user plane and control plane may execute at different sites. Furthermore, it is possible that the user plane is distributed over multiple sites, or that the control plane is distributed, or both; a great variety of scenarios are possible. Placement policies that may be taken into account are, as mentioned above, latency, processing cost, bandwidth cost, etc.

In the following, a scenario is envisaged where it is desirable to split the control plane, i.e. where one part of the control plane is executed on a central site and the remaining part of the control plane is executed on local sites. Use cases that would benefit from this are:
- use cases where some UPFs and plugins are processed at a central site and at the same time other UPFs and plugins are processed at a local site. One such use case could be vehicle-to-network communication where latency-sensitive UPFs (e.g. information to/from the vehicle about its current surrounding and required processing in the network related to that information) are deployed at local sites and non-latency-sensitive UPFs (e.g. management, monitoring, logging, firmware upgrade, etc.) are deployed at a central site for economic reasons, and
- use cases which are latency-sensitive (e.g. augmented reality, virtual reality) and have all UPFs processed at a local site while user specific data and operational information are stored at a central site due to specific deployment, administrative or economic reasons.

One likely deployment scenario is to have a centrally deployed control plane and a distributed user plane. When such deployment is made in the above mentioned latency-sensitive use cases, then this causes unnecessary delays and processing overhead when a UE relocates between two base stations connected to the same local site. The following problems have been identified for those use cases:
- extra signaling delay; if mobility signaling is sent from the base station (access network) via an SC-AM in the local site to an SC-SM located in the central site, although the handover is performed in the local site, this causes extra signaling delay, and
- additional processing requirements; if all UPFs for a user are located at the local site and the handover is local to the site, then processing steps S106-S111 in FIG. 3 are not needed. They will not result in any changes, only extra processing load and energy consumption.

Figure 4:
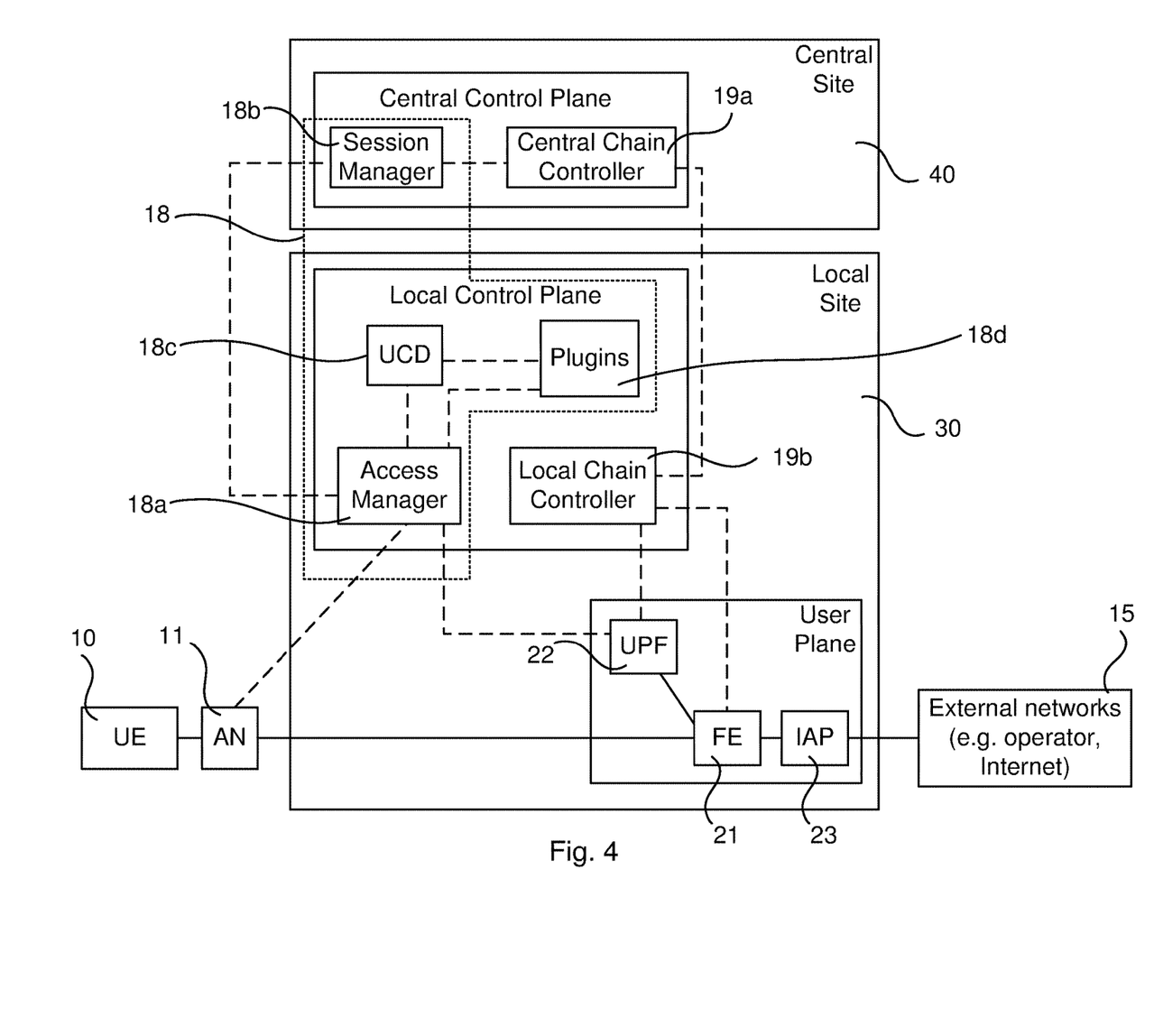
FIG. 4 illustrates a 5G core network architecture as proposed in an embodiment.

FIG. 4 illustrates a 5G core network architecture as proposed in an embodiment, FIG. 4 showing a deployment of the logical architecture of FIG. 2.

As can be concluded from FIG. 4, the core network control plane is in this particular exemplifying embodiment distributed over two remotely located sites; a first site referred to as a local site 30, and a second site 40 referred to as a central site.

Similar to the core network of FIG. 2, the architecture is divided into a control plane and a user plane. In this embodiment, the mobile device 10 communicates with the local control plane and the user plane located in the first site 40, via one or more ANs 11, e.g., a novel 5G radio, E-UTRAN or even a fixed access, connected to the local site 30.

Like in FIG. 2, the SC 18 includes an AM 18a for controlling the access of the mobile device 10 connecting to the core network. There is one AM for each supported access technology (e.g. LTE, WiFi). For an LTE access, the AM 18a would perform the access-specific functions of the MME.

The SC 18 further comprises an SM 18b for controlling user sessions and creating a service chain for the user, and a UCD 18c for storing user-specific data and information identifying a current base station of this user. A plugin 18d can subscribe to certain changes in this database. The SC 18 may comprise one or more plugins for implementing appropriate functionality. For instance, the AM 18a may be implemented as a plugin.

In the deployment illustrated with FIG. 4, the SC 18 is distributed over the local site 30 and the central site 40, where the SM 18b is arranged in the central site 40, while the AM 18a and the UCD 18c is arranged in the local site 30.

Further in the deployment of FIG. 4, the CC 19—which manages the setup and maintenance of the service chain in the user plane—has been distributed where a Central Chain Controller 19a (CCC) is arranged in the central control plane while a Local Chain Controller 19b (LCC) is arranged in the local control plane. Even though not shown in FIG. 4, the central control plane also contains the LR, the PCRF and the HSS illustrated and discussed with reference to FIG. 2.

The FE 21 forwards each packet to one of its ports based on rules it has received from the control plane. An FE 21 may forward a packet through one or more UPFs 22. An FE 21 is only concerned with the actual forwarding; it does not classify or modify a packet. Each use case will have a different set of UPFs and every packet for a user will travel through the set of UPFs ("the UPF chain") for that user. As previously discussed, the IAP 23 enables a network without a mobility anchor point.

The FE 21 is connected to LCC 19b in the local control plane and to the UPF 22. Advantageously, in this embodiment the AM 18a in the local control plane is configured to determine whether an "optimized local handover" is allowed to be performed, as will be described in more detail in the following.

A typical site structure of today complies with the following hierarchy:
1. Lowest in the hierarchy is a base station site. It hosts the base station hardware and software.
2. Then follows an aggregation site. It is used on transport level to aggregate traffic from multiple base station sites.
3. Next in the hierarchy is a regional site, which spans e.g. a greater metropolitan area, where parts of the core network may run.
4. Last is the national site. Typically are just a few of these in a country. Here the rest of the core network runs.

The site structure may also differ per operator. Small operators may skip e.g. the regional sites. Very large operators may have additional levels in the hierarchy. The hierarchy often also differs between urban and rural areas. There is no standard site hierarchy.

With reference to the 5G core network of FIG. 4, the local site 30 could constitute an aggregation site or regional site while the central site could constitute a regional or national site.

Figure 5:
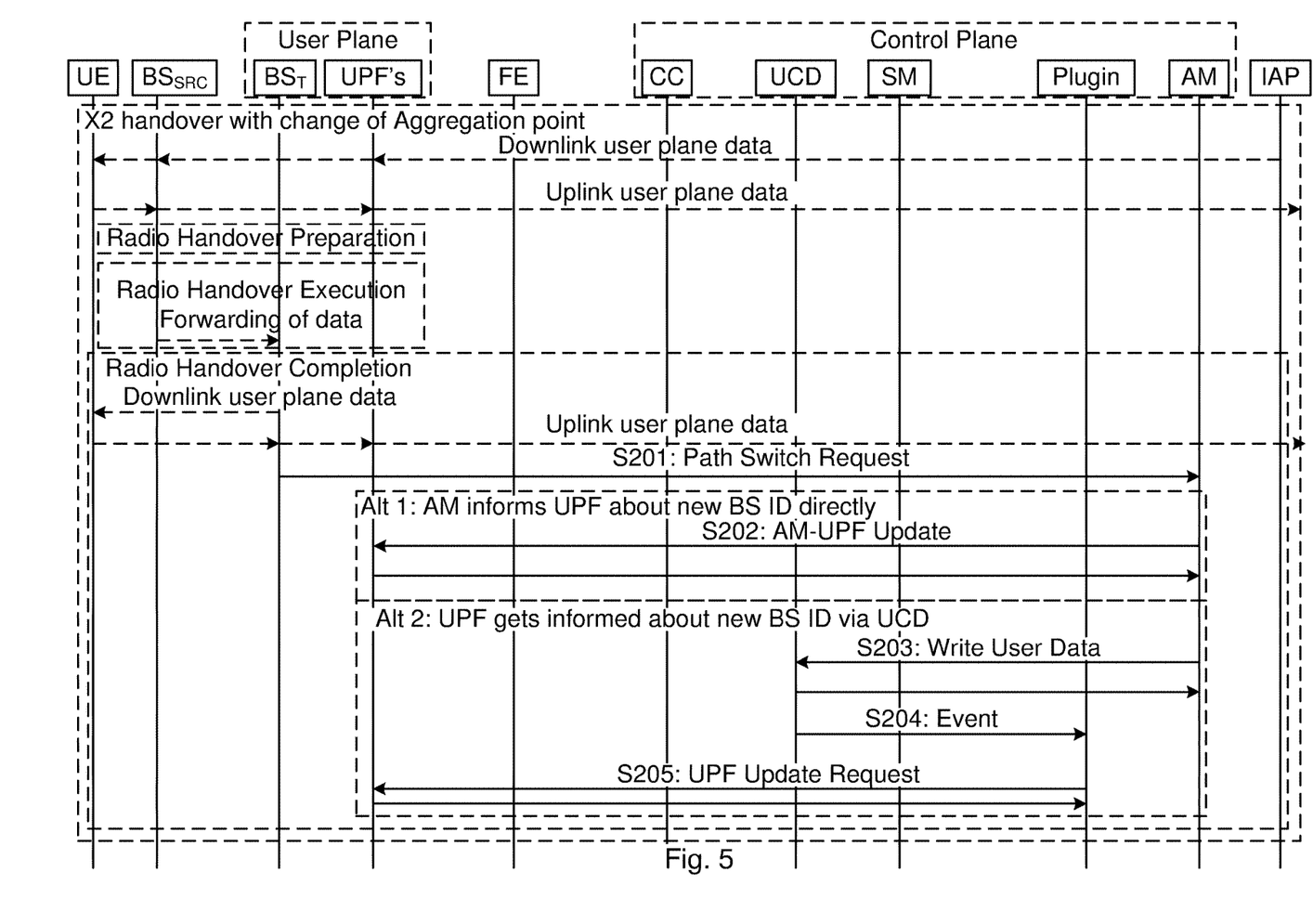
FIG. 5 shows a signalling diagram illustrating handover of a UE in the system of FIG. 4.

FIG. 5 shows a signalling diagram illustrating a UE 10 undergoing a mobility event in the form of a handover of the UE 10 from a base station to which it currently is connected ($BS_{SRC}$) to a target base station to which it is to be handed over ($BS_T$), where the two base stations are connected to the same local site 30.

Now, after the two base stations $BS_{SRC}$ and $BS_T$ initially have engaged in communication over an X2 interface for initiating the handover of the UE 10, the $BS_T$ submits in step S201 information regarding the mobility event in the form of a Path Switch Request to the AM 18a of the SC 18 comprising a target base station identifier $BS\text{-}ID_T$ in the form of an IP address, and an identifier UE-ID for the UE 10.

As a result of the Path Switch Request, one or more UPFs 22 serving the mobile communication device must, as previously has been discussed with reference to the signaling diagram of FIG. 3, be provided with information $BS\text{-}ID_T$ identifying the target base station $BS_T$ as well as information UE-ID identifying the UE 10. It is noted that only UPFs being a part of the service chain for this particular event is provided with the information; the UE 10 may very well be connected to other UPFs for receiving other services, which other UPFs not necessarily need to be provided with the information that a mobility event has occurred.

With the invention, this required information will advantageously be provided by the AM 18a to the UPFs 22 without passing the central control plane in the second site 40.

In a first alternative, the AM 18a informs the UPF 22 directly in step S202 by submitting an AM-UPF Updated including $BS\text{-}ID_T$ and UE-ID such that the UPF 22 can submit downlink packages to the base station $BS_T$ serving the UE 10 after the handover is completed. As is shown in FIG. 5, this may be followed by a confirmation submitted by the UPF 22.

In a second alternative, the AM 18a informs the UCD 18c that a handover is to occur in step S203 (possibly followed by a confirmation). As previously was described, the UCD 18c stores information identifying the current base station for a user, so the AM 18a updates the UCD 18c with the new location of the UE 10. An appropriate plugin 18d can subscribe to certain changes occurring in the UCD 18c.

For example, the plugin 18d could request to be informed when the current base station for this user changes. If so, an event occurs and the plugin 18d would be informed accordingly as is illustrated in the Event message received in step S204.

As a result, the plugin 18d submits a UPF Update Request to the UPF 22 in step S205 comprising a target base station identifier (here denoted UPF-Data), and an identifier UE-ID for the UE 10.

Further, in step S206, the AM 18a acquires information indicating if the AM 18a is allowed to finish its mobility event procedure—in this particular example being a handover procedure—without informing the SM 18b in the central control plane located in the second site 40 that the access of the UE 10 is being transferred. In FIG. 4, this is expressed as an "optimized local handover", a local handover being a handover between two base stations both connected to the first site 30.

Now, if this is the case, the AM 18a finishes, in step S207, the handover procedure that was initiated by the Path Switch Request received in step S201, without informing the SM 18b of the central control plane that the access of the UE 10 is being transferred from the source base station $BS_{SRC}$ to the target base station $BS_T$.

This is highly advantageously, as there is no need to for the core network to perform the steps denoted S106-S113 (to comply with the notation used in FIG. 3), which were described in detail in FIG. 3.

In an embodiment, the optimized local handover is allowed if the AM 18a is located in the same site, in this particular example the first site 30, as the UPF(s) being informed of the handover in steps S202 or S205.

In an embodiment, the AM 18a is provided with the information in step S206 as to whether it may finish the handover procedure in step S207 by the SM 18b in the central control plane, for instance already during a Protocol Data Unit, PDU, session establishment procedure undertaken when the UE 10 sets up a connection with a PDU network 15 via the core network.

As an example, the UE 10 will, via a base station in the AN 11, submit to the AM 18a a conventional PDU Connection Request indicating Access Point Name (APN) of the packet data network 15 with which it desires to connect. The AM 18a will in its turn submit a New Session Request to the SM 18b, and after the required control and user plane processing has been performed to set up the PDU session, the SM 18b submits a New Session Acknowledgement to the AM 18a. In an embodiment, the New Session Acknowledgement is configured to comprise the information as to whether the AM 18a is allowed to finish the handover procedure in step S207 or not. The AM 18a stores the information locally for subsequent access. Hence in step S206, the AM 18a fetches the locally stored information. The SM 18b will only send that information when there are no UPFs in other sites (other than the local site 30) that needs to be made aware about UE location updates.

Further, the New Session Acknowledgement may be extended with further information, e.g. "optimized local handover allowed" but only for a certain period, or only for UE handover between certain base stations. Other additions could be that optimized local handover is allowed, but after a certain time or certain number of handovers the new BS ID shall still be reported to the SM 18b.

The proposed solution allows for a split SC deployment where latency-sensitive functionality is located close to the end-user, i.e. in local site 30, and non-latency-sensitive SC functionality is located in central site 40, i.e. it allows for different deployment options of the control plane based on operator requirements.

The SC functionality of the local site 30 is related to local mobility handling of the UE 10 moving between access points connected to the same local site 30. The decision to approve or not approve an optimized handover can be taken locally and does not need any support from the central control plane functionality.

For certain use cases latency requirements are very strict and are only achieved when the user plane and (at least parts of) the control plane are both deployed at local sites, i.e. close to the end-user. The proposed solution is provided by the invention ensures that the most strict latency requirements are met by shortcutting unnecessary signaling and processing.

Reduced number of processing steps is preferred both from a latency and energy consumption view. The proposed solution makes it possible to reduce the number of processing steps.

An additional benefit of the proposed solution is that processing is distributed over multiple sites. An operational failure of a node (e.g. a computer or server) in the central site would typically affect several users while a similar failure in the proposed distributed solution only affects those users connected to the non-operational computer on the specific site.

In a further embodiment, the AM 18a acquires information as to which UPF(s) 22 should be informed of the handover in steps S202 or S205.

A number of options is envisaged; the AM 18a may be informed about the relevant UPF(s) 22 to notify that a mobility event has occurred by the SM 18b, for instance already during a PDU session establishment procedure undertaken when the UE 10 sets up a connection with a PDU network 15 via the core network, in which case the information is stored locally at the AM 18a as previously discussed.

Alternatively, there is a pre-configuration in the AM 18a on which UPF(s) 22 to inform abut the handover.

In a further alternative embodiment, the AM 18a stores the mobility event information in the UCD 18c, in which case the UPF(s) 22 that are interested subscribe to UCD events and is informed of the handover. This would correspond to alternative 2 in FIG. 4.

Figure 6:
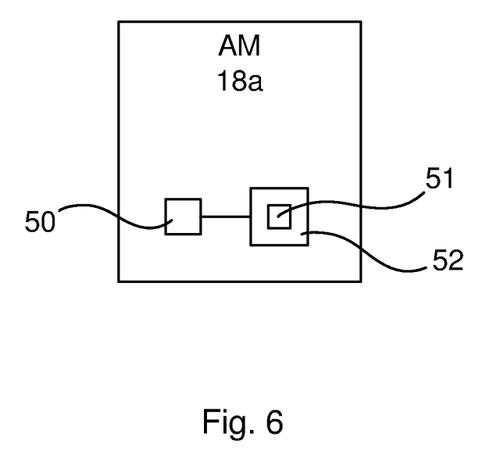
FIG. 6 illustrates an access manager according to an embodiment.

With reference to FIG. 6, the steps of the method performed by the AM 18a according to embodiments are in practice performed by a processing unit 50 embodied in the form of one or more microprocessors arranged to execute a computer program 51 downloaded to a suitable storage volatile medium 52 associated with the microprocessor, such as a Random Access Memory (RAM), or a non-volatile storage medium such as a Flash memory or a hard disk drive. The processing unit 50 is arranged to cause the AM 18a to carry out the method according to embodiments when the appropriate computer program 50 comprising computer-executable instructions is downloaded to the storage medium 52 and executed by the processing unit 50. The storage medium 52 may also be a computer program product comprising the computer program 51. Alternatively, the computer program 51 may be transferred to the storage medium 52 by means of a suitable computer program product, such as a Digital Versatile Disc (DVD) or a memory stick. As a further alternative, the computer program 31 may be downloaded to the storage medium 52 over a network. The processing unit 50 may alternatively be embodied in the form of a digital signal processor (DSP), an application specific integrated circuit (ASIC), a field-programmable gate array (FPGA), a complex programmable logic device (CPLD), etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by an access manager of transferring data in a wireless communication system comprising a control plane distributed over at least one first site and over at least one second site, wherein a session manager is arranged in the control plane of the second site and the access manager is arranged in the control plane of the first site, the first site being remote from the second site and located physically closer to a radio access network of the wireless communication system, comprising:

receiving, from a target base station to which a wireless communication device is to be handed over, a path switch request where access of the wireless communication device is being transferred from a source access point to a target access point, the access points being connected to said at least one first site; further being characterized in comprising:

providing one or more User Plane Functions, UPFs, serving the wireless communication device with information identifying the target access point and information identifying the wireless communication device, wherein the information is provided to the one or more UPFs without passing the control plane of the second site; and acquiring, from the session manager, information indicating if the access manager is allowed to finish its path switch request procedure without informing the session manager that the access of the wireless communication device is being transferred; and if so finishing the path switch request procedure without informing the session manager that the access of the wireless communication device is being transferred.

2. The method of claim 1, wherein the step of acquiring information comprises:

acquiring information indicating if said one or more UPFs serving the wireless communication device are located in the at least first site.

3. The method of claim 1, wherein the step of acquiring information comprises:

requesting the information from the session manager arranged in the control plane of the second site.

4. The method of claim 1, wherein the step of acquiring information comprises:

fetching the information indicating if the access manager is allowed to finish its path switch request procedure without informing the session manager from a local storage, the information indicating if the access manager is allowed to finish its path switch request procedure without informing the session manager having been previously received from the session manager.

5. The method of claim 1, wherein the step of acquiring information comprises:

acquiring information regarding which one or more UPFs serving the wireless communication device should be provided with information identifying the target access point and information identifying the wireless communication device.

6. The method of claim 1, wherein the step of providing one or more UPFs with information comprises:

submitting a target access point identifier and a wireless communication device identifier directly to the one or more UPFs.

7. The method of claim 1, wherein the step of providing one or more UPFs with information comprises:

submitting a target access point identifier and a wireless communication device identifier to a User Context Database, UCD, located in the control plane of the at least one first site, the UCD informing a control plane plugin of the at least one first site, which plugin submits the target access point identifier and the wireless communication device identifier directly to the one or more UPFs.

8. An access manager configured to transfer data in a wireless communication system comprising a control plane distributed over at least one first site and over at least one second site, wherein a session manager is arranged in the control plane of the second site and the access manager is arranged in the control plane of the first site, the first site being remote from the second site and located physically closer to a radio access network of the wireless communication system, the access manager comprising a processing unit and a memory, said memory containing instructions executable by said processing unit, whereby said access manager is operative to:
  receive information, from a target base station to which a wireless communication device is to be handed over, regarding a path switch request where access of the wireless communication device is being transferred from a source access point to a target access point, the access points being connected to said at least one first site; further being characterized in being operative to:
  provide one or more User Plane Functions, UPFs, serving the wireless communication device with information identifying the target access point and information identifying the wireless communication device, wherein the information is provided to the one or more UPFs without passing the control plane of the second site; and
  acquire, from the session manager, information indicating if the access manager is allowed to finish its path switch request procedure without informing the session manager that the access of the wireless communication device is being transferred; and if so
  finish the path switch request procedure without informing the session manager that the access of the wireless communication device is being transferred.

9. The access manager of claim 8, further being operative to, when acquiring the information:
  acquire information indicating if said one or more UPFs serving the wireless communication device are located in the at least first site.

10. The access manager of claim 8, further being operative to, when acquiring the information:
  request the information from the session manager arranged in the control plane of the second site.

11. The access manager of claim 8, further being operative to, when acquiring the information:
  fetch the information indicating if the access manager is allowed to finish its path switch request procedure without informing the session manager from a local storage, the information indicating if the access manager is allowed to finish its path switch request procedure without informing the session manager having been previously received from the session manager.

12. The access manager of claim 8, further being operative to, when acquiring the information:
  acquire information regarding which one or more UPFs serving the wireless communication device should be provided with information identifying the target access point and information identifying the wireless communication device.

13. The access manager of claim 8, further being operative to, when providing the one or more UPFs with information:
  submit a target access point identifier and a wireless communication device identifier directly to the one or more UPFs.

14. The access manager of claim 8, further being operative to, when providing the one or more UPFs with information:
  submit a target access point identifier and a wireless communication device identifier to a User Context Database, UCD, located in the control plane of the at least one first site, the UCD informing a control plane plugin of the at least one first site, which plugin submits the target access point identifier and the wireless communication device identifier directly to the one or more UPFs.

15. A method performed by an access manager of transferring data for a wireless communication system having a control plane distributed over at least one first site and over at least one second site wherein a session manager is arranged in the control plane of the second site and an access manager is arranged in the control plane of the first site, the first site being remote from the second site and located physically closer to a radio access network of the wireless communication system, a non-transitory computer-readable storage medium comprising a computer program product including instructions to cause at least one processor to:
  receive, from a target base station to which a wireless communication device is to be handed over, a path switch request where access of the wireless communication device is being transferred from a source access point to a target access point, the access points being connected to said at least one first site; further being characterized in being operative to:
  provide one or more User Plane Functions, UPFs, serving the wireless communication device with information identifying the target access point and information identifying the wireless communication device, wherein the information is provided to the one or more UPFs without passing the control plane of the second site; and
  acquire, from the session manager, information indicating if the access manager is allowed to finish its path switch request procedure without informing the session manager that the access of the wireless communication device is being transferred; and if so
  finish the path switch request procedure without informing the session manager that the access of the wireless communication device is being transferred.

* * * * *